United States Patent
Danti et al.

[15] 3,652,169
[45] Mar. 28, 1972

[54] VIEWER FOR TRANSPARENT SLIDES

[72] Inventors: Bernard R. Danti, Lexington; Paul E. Brefka, Southboro; Wayne S. Merrill, Bedford, all of Mass.

[73] Assignee: Milliport Corporation, Bedford, Mass.

[22] Filed: Apr. 1, 1971

[21] Appl. No.: 130,262

[52] U.S. Cl. ................................356/244, 40/106.1
[51] Int. Cl. .......................................G01n 21/04
[58] Field of Search .................356/244, 246; 40/106.1; 350/238, 239

[56] References Cited

UNITED STATES PATENTS 2,495,912  1/1950  Wood ..................................356/244

Primary Examiner—Ronald L. Wibert
Assistant Examiner—Orville B. Chew, II
Attorney—Kenway, Jenney & Hildreth

[57] ABSTRACT

A viewer for slides useful in clinical testing. The viewer is particularly useful for viewing precipitates formed in optically transparent or translucent gels contained in transparent trays. It includes a base member having side walls, a cover plate and a mask spaced above the cover plate. The slide is placed between the mask and the upper surface of the cover plate. Means are provided defining an entrance pupil above the mask. The slide is illuminated from a light source within the base. Light passes through a slit in the cover plate from the source to the location in the gel where the precipitate is most likely to be present. The slit is however masked from the view of the user by the mask and entrance pupil. Thus, the precipitate is readily seen if present, since it diffuses the light from source. If it is absent, only a black field of view is seen, since the upper surface of the cover plate is blackened in the viewing area.

8 Claims, 3 Drawing Figures

PATENTED MAR 28 1972  3,652,169

INVENTORS
BERNARD R. DANTI
PAUL E. BREFKA
WAYNE S. MERRILL
BY Kenway Jenney & Hildreth
ATTORNEYS

VIEWER FOR TRANSPARENT SLIDES

BACKGROUND OF THE INVENTION

Our invention relates to a viewer particularly useful for visually determining the presence or absence of a precipitate in an optically transparent or translucent gel material contained in a transparent tray.

In clinical testing for some diseases, and particularly hepatitis, slides have been developed which, after suitable procedures, indicate the presence of the disease by a white band of precipitate in an optically transparent or translucent gel. A slide for such a purpose is described for example in the presently pending U.S. Pat. application Ser. No. 84,587 entitled "Electrophoretic Apparatus" filed Oct. 28, 1970 by Post et al., and assigned to the assignee of this application.

Such slides usually include a shallow tray made of transparent plastic material filled with a gel which is also substantially transparent. Two sets of "wells" are formed in the gel. A chemical serum is placed in one set of wells and a sample of serum to be checked is placed in the other. Thereafter the slide is processed, as for example by electrophoresis techniques. If the sample is "positive" i.e., contains materials for which the test is specific, a white line of precipitate will form in the gel between the sample and serum well. This white line may be quite faint and if the slide is merely examined by ambient illumination, faint lines may be difficult to see.

To overcome this problem we have developed a relatively simple and inexpensive viewer, which incorporates "dark field" illumination of the cell. If a precipitate band is present it is readily visible, even if quite faint. It is to this novel viewer that this present application is directed. A slide, as above described, provides for running a plurality of tests. In the viewer of our invention the results of each test may be viewed individually and means are provided for conveniently advancing the individual test areas of the slide into the viewing area.

Accordingly, it is a principal object of our invention to provide a viewer to assist in determining the presence of a precipitate band in an otherwise optically transparent or translucent medium. Another object of our invention is to provide a viewer of the type described which is usable with slides or other devices which have been used to carry out a plurality of tests. A still further object of our invention is to provide a viewer of the type described which is relatively simple and economical in construction and yet reliable in operation.

SUMMARY OF THE INVENTION

The viewer of our invention includes a base member having upstanding sides and a cover plate. A light source is located within the base member below the cover. A mask is provided above the cover plate, the space between the lower surface of the mask and the upper surface of the cover plate being dimensioned to receive the edge of the slide. An entrance pupil is formed by structure located above the mask, and with the mask defines a viewing axis which is substantially normal to the surface of the cover plate on which the slide rests.

A slit is provided in the cover plate in the area outside the field of view of the mask. This slit is positioned so that the center of the light source, the slit and the portion of the slide in which the precipitate is most likely to appear lie on an approximate straight line which intersects the viewing axes at about the location where the precipitate band may be expected. The cover plate upper surface is desirably light absorbing i.e., black in the viewing area defined by the mask.

Light from the source passes through the slit, which is not visible to the observer, and then through the transparent plastic tray and the gel therein. If no precipitate is present, there is nothing to be seen in the unmasked viewing area since no scattering takes place therein. If a precipitate band is present however it will scatter the light from the source and stand out sharply as a white line against the dark background of the viewing area. Thus, the user can readily determine not only the presence or absence of a precipitate band, but also the amount of precipitate which has been formed, thereby providing additional clinical data.

BRIEF DESCRIPTION OF THE DRAWING

The viewer of our invention is illustrated in the accompanying drawing in which.

DESCRIPTION OF THE PREFERRED EMBODIMENT

The viewer of our invention includes a base member 10 having a bottom 10a and end walls 10b. The base is preferably made of a plastic material and an integral stiffening rib 10c is provided along the bottom and ends of the base. Integral upstanding side walls are also provided on the base member.

Figure 1:
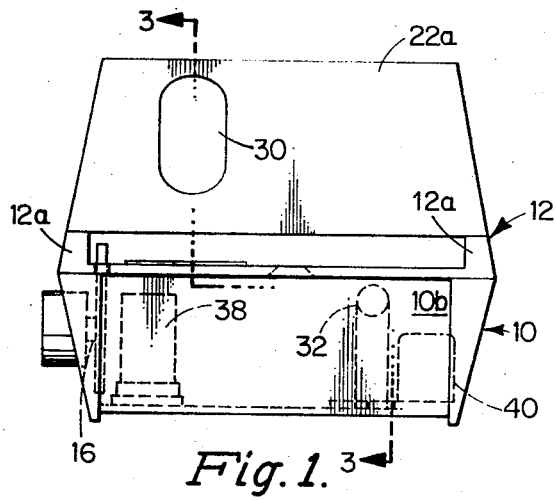
FIG. 1 is a front elevation of the viewer.

A cover plate 12, preferably of a metal such as aluminum is supported on the side and end walls of the base 10. As best seen in FIG. 1, the cover plate 12 is channel-shaped in cross section and the slide to be viewed is received in the channel.

Figure 2:
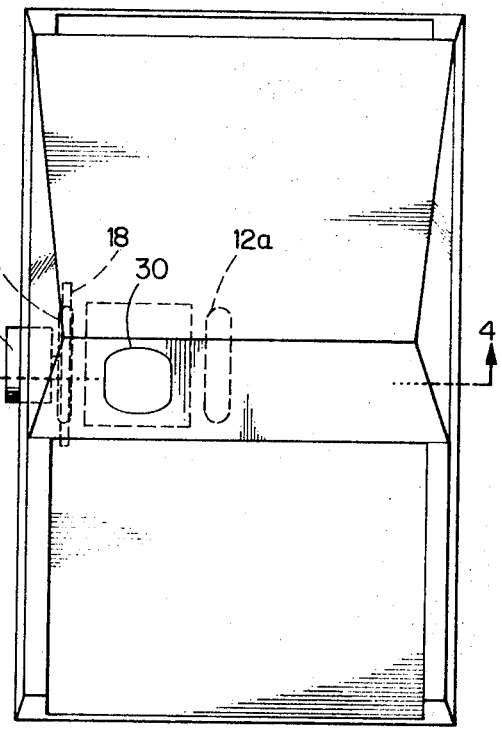
FIG. 2. is a top plan view of the viewer of FIG. 1.
Figure 3:
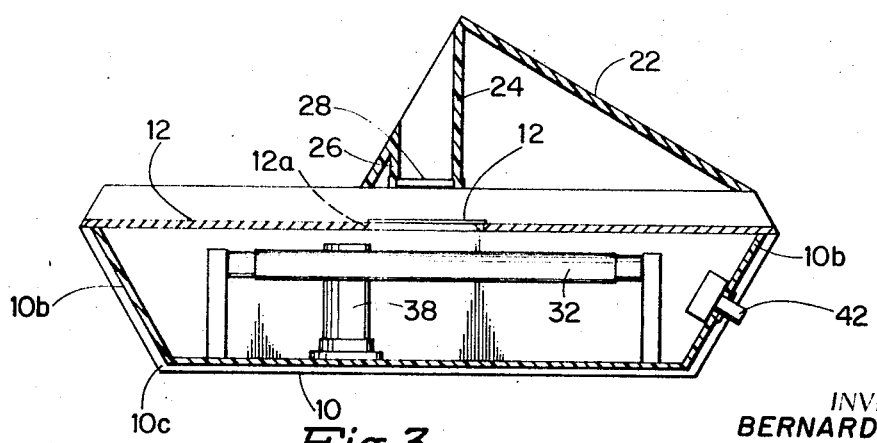
FIG. 3 is a cross section through the viewer taken on the line 3—3 of FIG. 2.

Two openings are provided in the cover plate 12, the slit 12a through which light passes from the light source in the base and a slit 12b at one edge of the plate. As shown in FIGS. 2 and 3, slit 12a is located about the middle of the length of the cover plate and is spaced across the width of the plate so that it will lie on the illuminating axis as previously described.

A shaft 16 extends through one side of the base member 10 and a pinion gear 18 is mounted thereon. The teeth of the pinion gear extend upwardly through the slit 12b, and can engage a rack formed in the bottom of the slide along one of its edges. A knob 20 is attached to the outer end of the shaft 16 so that by rotation of the knob 20 the operator can conveniently move the slide in the channel.

A hood member 22 is supported on the upper surfaces of the side rails of cover plate 12 as best seen in FIGS. 1 and 3. The hood is triangular in vertical cross section as seen in FIG. 3. It is preferably, although not necessarily molded of plastic material. Two interior vertical wall members 24 and 26 are molded integrally with the cover of the hood. These extend across the width of the hood. A horizontal plate 28 is secured to the bottom of the members 24 and 26, the bottom surface of the plate 28 lying in the same plane as the upper surfaces of the side rails of cover plate 12. An opening 28a which defines the viewing area is provided in the plate 28. Additionally an opening 30 is provided in the surface 22a of the hood 22. The opening 30 defines an entrance pupil for vertical viewing when combined with the opening 28a in the plate 28.

A light source 32 preferably of the fluorescent type and preferably one which emits green light is located in the base 10. It is supported by conventional electrodes 34 and 36. A starter 38 and ballast 40 are also located in the base. A push button switch 42 is located in one end wall to control the light source 32.

It will be noted that the longitudinal center of the light source 32 is approximately at the center of the length of slit 12a to insure uniform illumination of the slit. In practice we have found that a Westinghouse Manufacturing Company 4 watt fluorescent bulb, Type No. F4T5/G, Green performs satisfactorily as a light source.

Figure 4:
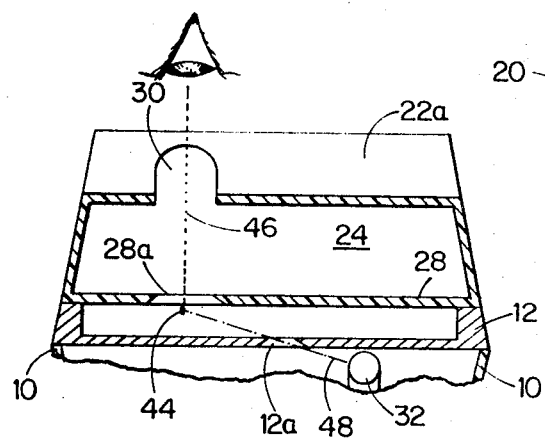
FIG. 4 is a schematic illustration showing the manner in which the various optical elements are arranged.

In FIG. 4 we have illustrated the relative placement of the various components to achieve the desired optical properties of our viewer. A slide is shown in broken line in position below the opening 28a formed in the plate 28. The precipitate band, if present is most likely to occur where indicated at 44. It will be observed that the location 44 lies on the viewing axis 46 defined by the opening 28a and the opening 30 in the front surface 22a of the hood. It will also be observed that a line 48 drawn from the center of the light source 32 through the approximate center of the slit 12a intersects the axis 46 at the most probable location of the band 44.

The edges of the slit 12a are beveled as shown and it will be observed that actually a cone of light rays will pass through the slit 12a and illuminate a cone-shaped volume of the cell. It can also be seen in FIG. 4 that the slit 12a is shielded from the direct view of the observer by the plate 28.

In practice the interior of the housing 22, including the surfaces of walls 24 and 26, plate 28 and the upper surface of the cover plate 12 in the vicinity of the viewing area are blackened to absorb stray light.

Thus, in the absence of a precipitate band in the transparent or translucent gel material, the viewer merely sees a dark field in the viewing area. However, if a band is present, the light striking it is diffused and the band is rendered highly visible against the dark background.

It will be apparent from the foregoing description that viewers of our invention do not require expensive optical elements such as lenses, prisms, mirrors or the like. However, more complex viewers embodying our invention might use such devices and their absence from this preferred embodiment is not meant to preclude their use. Further, while we have provided a viewer specifically designed to view precipitate bands in otherwise substantially transparent slides, it would be useful for viewing particles in any transparent or translucent medium.

It will thus be seen that we have provided a simple viewer for use in viewing precipitate bands or particles in a transparent medium which greatly enhances the ability of the user to determine the presence or absence of such bands or particles and also enables the user to obtain a qualitative estimate of the amount of precipitate or the number of particles.

Having described out invention, we claim:

1. Apparatus for viewing transparent slides in which a precipitate band may be formed in a substantially optically clear material comprising in combination:
   a. a base member having upstanding side and end walls;
   b. a cover plate supported on the side and end walls of said base member;
   c. masking means covering at least a portion of said slide when said slide is in viewing position and exposing a portion thereof for viewing, thereby defining a viewing area;
   d. means defining an entrance pupil positioned above said masking means and cooperating with said masking means to determine a viewing axis; and
   e. illuminating means including a light source mounted in said base member below said cover plate, and a slit formed in said cover plate, said slit and the optical center of said light source lying approximately on a straight line and defining an illuminating axis, said illuminating axis intersecting said viewing axis at about the most probable location of the precipitate band; said slit in said cover plate lying outside the viewing area defined by said mask.

2. The apparatus of claim 1 wherein said slit is beveled to slope outwardly from the top surface of said cover plate toward the base member walls.

3. The apparatus of claim 1 wherein the portion of the cover plate in the vicinity of the viewing area is light absorbing.

4. The apparatus of claim 3 wherein the slit is beveled to slope outwardly from the top surface of said cover plate toward the base member walls.

5. Apparatus for viewing transparent slides in which a precipitate band may be formed in a substantially optically clear material comprising in combination:
   a. a base member
   b. a cover plate supported on said base member;
   c. a hood member covering at least a portion of said cover plate, said hood member including a masking plate, which plate defines a viewing area, and an entrance pupil formed in said hood member and located above said masking plate and cooperating with said masking plate to determine a viewing axis;
   d. illuminating means including a light source mounted on said base member below said cover plate, and a slit formed in said cover plate, the center of said slit and the optical center of said light source lying approximately on a straight line and defining an illuminating axis, said illuminating axis intersecting said viewing axis at about the most probable location of the precipitate band when said slide is in viewing position said slit in said cover plate lying outside the viewing area defined by said mask.

6. Apparatus for viewing transparent slides in which a precipitate band may be formed in a substantially optically clear material comprising in combination:
   a. a slide-supporting plate having a slide-supporting surface;
   b. masking means covering at least a portion of a slide when the slide is in viewing position on said slide-supporting plate and exposing another portion of said slide for viewing, thereby defining a slide viewing area;
   c. means defining an entrance pupil positioned above said masking means and cooperating with said masking means to determine a viewing axis; and
   e. illuminating means including a light source, and a slit formed in said slide supporting plate, the center of said slit and the optical center of said light source lying on a straight line and defining an illuminating axis, said illuminating axis intersecting said viewing axis at about the most probable location of the precipitate band; said slit in said slide-supporting plate lying outside the viewing area defined by said mask.

7. The apparatus of claim 6 wherein a portion of the surface of the slide-supporting plate in the vicinity of the viewing area is light absorbing.

8. The combination defined in claim 6 in which said viewing axis is substantially normal to the slide supporting surface of the slide supporting plate.

* * * * *